United States Patent
Lin et al.

(10) Patent No.: US 8,164,928 B2
(45) Date of Patent: Apr. 24, 2012

(54) METHOD AND APPARATUS OF OPERATING A PRIMARY-SIDE-REGULATION POWER CONVERTER AT BOTH CONTINUOUS CURRENT MODE AND DISCONTINUOUS CURRENT MODE

(75) Inventors: Li Lin, Taipei (TW); Rui-Hong Lu, Shueishang Township, Chiayi County (TW)

(73) Assignee: System General Corporation, Sindian, Taipei County (TW)

( * ) Notice: Subject to any disclaimer, the term of this patent is extended or adjusted under 35 U.S.C. 154(b) by 201 days.

(21) Appl. No.: 12/819,340

(22) Filed: Jun. 21, 2010

(65) Prior Publication Data

US 2011/0267850 A1 Nov. 3, 2011

Related U.S. Application Data

(60) Provisional application No. 61/343,483, filed on Apr. 28, 2010.

(51) Int. Cl.
*H02M 3/335* (2006.01)

(52) U.S. Cl. ............... 363/21.16; 363/21.13; 363/21.18

(58) Field of Classification Search ............... 363/21.05, 363/21.07, 21.08, 21.09, 21.1, 21.13, 21.16, 363/21.17, 21.18, 97, 131

See application file for complete search history.

(56) References Cited

U.S. PATENT DOCUMENTS

| | | | | |
|---|---|---|---|---|
| 5,901,051 A | * | 5/1999 | Takahashi et al. | 363/21.18 |
| 6,078,510 A | * | 6/2000 | Spampinato et al. | 363/21.13 |
| 6,181,675 B1 | * | 1/2001 | Miyamoto | 370/218 |
| 6,842,350 B2 | * | 1/2005 | Yamada et al. | 363/21.16 |
| 6,912,141 B2 | * | 6/2005 | Konno | 363/49 |
| 7,061,780 B2 | * | 6/2006 | Yang et al. | 363/21.16 |
| 7,362,592 B2 | * | 4/2008 | Yang et al. | 363/21.13 |

* cited by examiner

*Primary Examiner* — Adolf Berhane
(74) *Attorney, Agent, or Firm* — Thomas|Kayden

(57) ABSTRACT

A method and an apparatus of operating a primary-side-regulation power converter at both continuous current mode and discontinuous current mode are provided. The apparatus includes a switching circuit, a signal generator, a correlation circuit, and a feedback modulator. The signal generator generates a half signal and a second sampling pulse in response to a switching signal. The correlation circuit receives the half signal, the second sampling pulse and a switching-current signal for generating a modulating current. The feedback modulator modulates a feedback signal in response to the modulating current, a detection signal and the switching signal. The detection signal obtained from a transformer is correlated to an output voltage of the primary-side-regulation power converter. An on-period of the half signal is half of an on-period of the switching signal. The switching-current signal is sampled at a falling-edge of the half signal.

7 Claims, 7 Drawing Sheets

METHOD AND APPARATUS OF OPERATING A PRIMARY-SIDE-REGULATION POWER CONVERTER AT BOTH CONTINUOUS CURRENT MODE AND DISCONTINUOUS CURRENT MODE

CROSS REFERENCE TO RELATED APPLICATIONS

The present application claims the benefit of U.S. provisional application entitled "PRIMARY-SIDE-REGULATION POWER CONVERTER OPERATED AT CONTINUOUS CURRENT MODE", Ser. No. 61/343,483, filed Apr. 28, 2010.

BACKGROUND OF THE INVENTION

1. Field of the Invention

The present invention relates generally to power converters, and more specifically to a primary-side-regulation power converter.

2. Description of the Related Art

A power converter is used to convert an unregulated power source to a regulated voltage or current. The power converter normally includes a transformer having a primary winding and a secondary winding to provide galvanic isolation. A switching device is generally connected to the primary winding to control energy transfer from the primary winding to the secondary winding.

FIG. 1 shows a primary-side-regulation power converter. A transformer 10 comprises a primary winding $N_P$, a secondary winding $N_S$ and an auxiliary winding $N_A$. Since the auxiliary winding $N_A$ and the secondary winding $N_S$ are magnetically coupled, the detection signal $V_{DET}$ obtained from the auxiliary winding $N_A$ will be correlated to an output voltage $V_O$ generated by the secondary winding $N_S$ via a rectifier 40 and a capacitor 45. Energy sourced from the auxiliary winding $N_A$ charges a capacitor 15 via a rectifier 12. A supply voltage $V_{CC}$ obtained across the capacitor 15 is utilized to power a controller 50. The controller 50 generates a driving signal $S_{PWM}$ to regulate an output current $I_O$ of the primary-side-regulation power converter in response to the detection signal $V_{DET}$. The driving signal $S_{PWM}$ drives a power transistor 20 for switching the transformer 10. The transformer 10 transfers the energy of an input voltage $V_{IN}$ to generate the output voltage $V_O$ of the primary-side-regulation power converter. A resistor 30 is connected in series with the power transistor 20 to convert a primary-side switching current $I_P$ flowing through the power transistor 20 into a switching-current signal $V_{IP}$. The switching-current signal $V_{IP}$ is supplied to the controller 50 for regulating the primary-side-regulation power converter. The primary-side-regulation power converter will be operated at discontinuous current mode (DCM) when the transformer 10 is fully discharged before next switching cycle starts. When the driving signal $S_{PWM}$ is enabled before the transformer 10 is fully discharged, the primary-side-regulation power converter will be operated at continuous current mode (CCM).

FIG. 2 shows the waveforms of the driving signal $S_{PWM}$ and the switching-current signal $V_{IP}$. A continuous current $I_A$ represents the energy stored in the transformer 10 before next switching cycle starts. When the continuous current $I_A$ is equal to zero, the primary-side-regulation power converter is operated at DCM. Otherwise, the primary-side-regulation power converter will be operated at CCM when the continuous current $I_A$ is not equal to zero. A ramp current $I_C$ represents the energy that is further charged to the transformer 10 during an on-period $T_{ON}$ of a switching cycle T of the driving signal $S_{PWM}$. A peak current $I_B$ equals to the sum of the continuous current $I_A$ and the ramp current $I_C$.

In order to regulate the output current $I_O$ from the primary side of the transformer 10, the continuous current $I_A$ is a parameter needed to know. Since a voltage spike will appear at the switching-current signal $V_{IP}$ whenever the driving signal $S_{PWM}$ becomes enabled, a true value of the continuous current $I_A$ will be therefore difficultly to be obtained. In conventional arts, two independent sampling circuitries are utilized to respectively sample two magnitudes of the switching-current signal $V_{IP}$ for calculating the continuous current $I_A$. However, two sampling circuitries have their respective inherent operational errors, which affect the regulating precision of the primary-side-regulation power converter. Furthermore, a double-size layout space will be occupied, which results in a higher manufacturing cost for the controller 50.

Therefore, a more precise and lower cost solution for regulating the output current $I_O$ of the primary-side-regulation power converter operated at both continuous current mode and discontinuous current mode is desired by the industries.

BRIEF SUMMARY OF THE INVENTION

An apparatus of operating a primary-side-regulation power converter at both continuous current mode and discontinuous current mode is provided. The apparatus comprises a switching circuit, a signal generator, a correlation circuit, and a feedback modulator. The switching circuit generates a switching signal to switch a transformer of the primary-side-regulation power converter. The signal generator generates a half signal and a second sampling pulse in response to the switching signal. The correlation circuit receives the half signal, the second sampling pulse and a switching-current signal for generating a modulating current. The feedback modulator modulates a feedback signal in response to the modulating current, a detection signal, and the switching signal. The detection signal obtained from the transformer is correlated to an output voltage of the primary-side-regulation power converter. The feedback signal is used to adjust a pulse width of the switching signal for regulating the primary-side-regulation power converter. An on-period of the half signal is half of an on-period of the switching signal. The switching-current signal is sampled at a falling-edge of the half signal.

The signal generator comprises a charging circuit, a pulse generator, and an output circuit. The charging circuit generates a level signal. A voltage level of the level signal is correlated to a pulse width of the switching signal. The pulse generator generates a first sampling pulse and the second sampling pulse. The first sampling pulse is used to change the level signal cycle-by-cycle. The second sampling pulse is used to reset the charging circuit. The output circuit generates the half signal having the on-period which is half of the on-period of the switching signal.

The correlation circuit comprises a sample-and-hold circuit and a voltage-to-current circuit. The sample-and-hold circuit generates a middle voltage in response to the on-period of the half signal. The voltage-to-current circuit generates the modulating current in response to the middle voltage.

The feedback modulator comprises an off-period converter, a full-period converter, a divider, an integrator, and an error amplifier. The off-period converter receives the detection signal to generate an off-period signal. The off-period signal is correlated to an off-period of the switching signal. The full-period converter receives the switching signal to generate a full-period signal. The full-period signal is correlated to a full-period of the switching signal. The divider generates an integrating signal in response to the off-period signal and the full-period signal. An enabled duration of the integrating signal is proportional to the value that the off-period of the switching signal is divided by the full-period of the switching signal. The integrator receives the modulating current and the integrating signal to generate an integrated signal. The error amplifier modulates the feedback signal in response to an error between the integrated signal and a reference signal.

A method of operating a primary-side-regulation power converter at both continuous current mode and discontinuous current mode is provided. Firstly, a switching signal is generated to switch a transformer. Next, a half signal having an on-period which is half of an on-period of the switching signal is generated. Next, a sampled switching-current signal is acquired at a falling-edge of the half signal. Next, a modulating current is generated in response to the sampled switching-current signal. Next, a feedback signal is modulated in response to the switching signal, a detection signal, and the modulating current. The detection signal is obtained from the transformer. The detection signal is correlated to an output voltage of the primary-side-regulation power converter. Last, a pulse width of the switching signal is adjusted for regulating an output current of the primary-side -regulation power converter in response to the feedback signal.

It is an object of the present invention to provide a precise regulation solution for the primary-side-regulation power converter.

It is also an object of the present invention to provide a low-cost regulation solution for the primary-side-regulation power converter.

It is also an object of the present invention to operating the primary-side-regulation power converter at both continuous current mode and discontinuous current mode.

It is to be understood that both the foregoing general descriptions and the following detailed descriptions are exemplary, and are intended to provide further explanation of the invention as claimed. Still further objects and advantages will become apparent from a consideration of the ensuing description and drawings.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
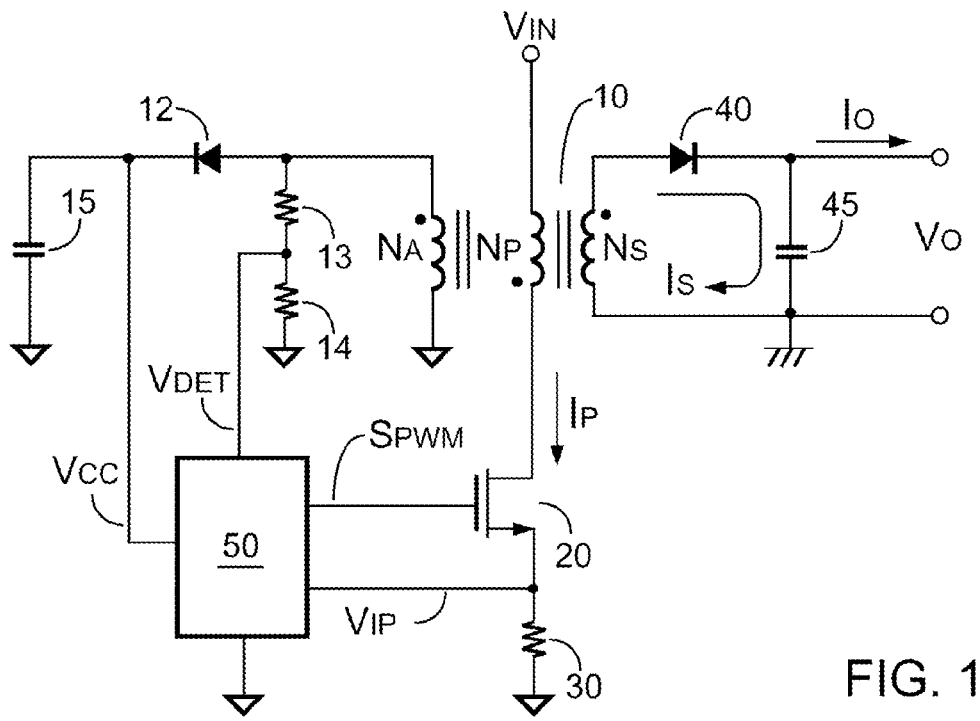
FIG. 1 shows a primary-side-regulation power converter.
Figure 2:
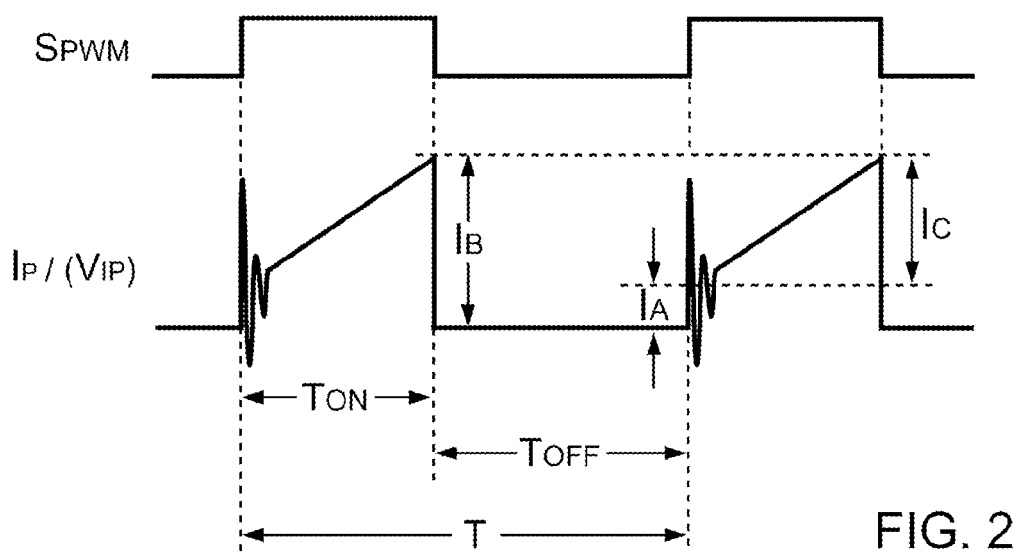
FIG. 2 shows the waveforms of a driving signal and a switching-current signal according to the present invention.
Figure 3:
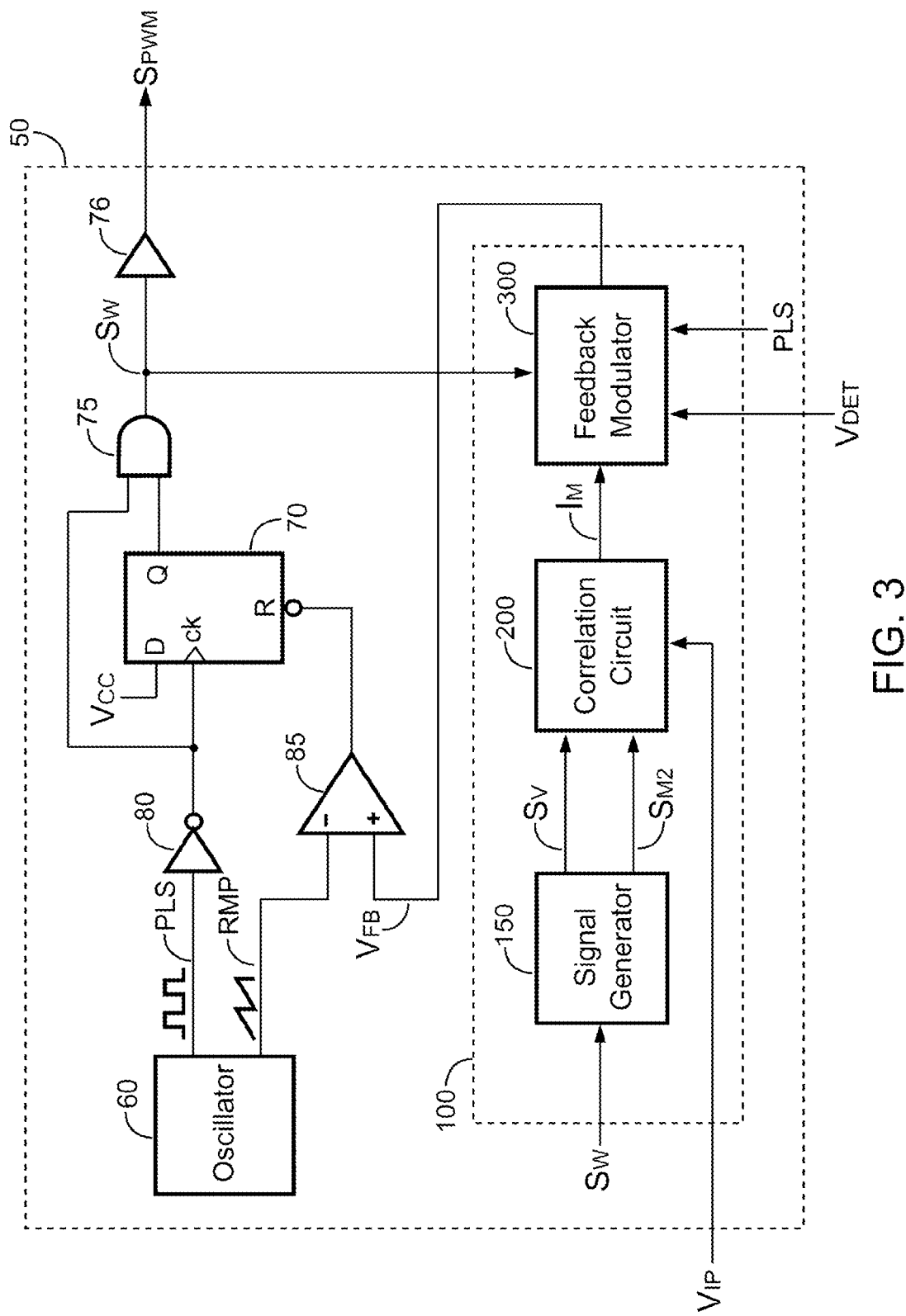
FIG. 3 shows an embodiment of a controller of the primary-side-regulation power converter according to the present invention.

FIG. 3 shows an embodiment of a controller 50 of the primary-side-regulation power converter according to the present invention. The controller 50 comprises a switching circuit and a feedback circuit 100. The switching circuit comprises an oscillator 60, an inverter 80, a comparator 85, a flip-flop 70, an AND gate 75 and a buffer 76. The feedback circuit 100 comprises a signal generator 150, a correlation circuit 200 and a feedback modulator 300. The oscillator 60 generate a pulse signal PLS and a ramp signal RMP. The pulse signal PLS sets the flip-flop 70 via the inverter 80. A first input of the AND gate 75 is connected to an output of the inverter 80. A second input of the AND gate 75 is connected to an output of the flip-flop 70. An output of the AND gate 75 generates a switching signal $S_W$. The buffer 76 receives the switching signal $S_W$ to generate a driving signal $S_{PWM}$ for driving the power transistor 20 in FIG. 1. The comparator 85 has a negative terminal and a positive terminal for respectively receiving the ramp signal RMP and a feedback signal $V_{FB}$. The feedback signal $V_{FB}$ generated by the feedback circuit 100 is used to adjust a pulse width of the switching signal $S_W$ for regulating the primary-side regulation power converter. Once the ramp signal RMP is higher than the feedback signal $V_{FB}$, the flip-flop 70 will be reset to disable the driving signal $S_{PWM}$ accordingly. The signal generator 150 receives the switching signal $S_W$ to generate a half signal $S_V$ and a second sampling pulse $S_{M2}$. The correlation circuit 200 receives the half signal $S_V$, the second sampling pulse $S_{M2}$, and a switching-current signal $V_{IP}$ to generate a modulating current $I_M$. Referring to FIG. 1, the switching-current signal $V_{IP}$ is converted from a primary-side switching current $I_P$ via the resistor 30. The feedback modulator 300 receives the switching signal $S_W$, the modulating current $I_M$, a detection signal $V_{DET}$, and the pulse signal PLS to modulate the feedback signal $V_{FB}$. As shown in FIG. 1, the detection signal $V_{DET}$ is obtained from the auxiliary winding $N_A$ of the transformer 10 via a voltage divider formed by resistors 13 and 14. The detection signal $V_{DET}$ is correlated to the output voltage $V_O$ of the primary-side-regulation power converter.

Figure 4:
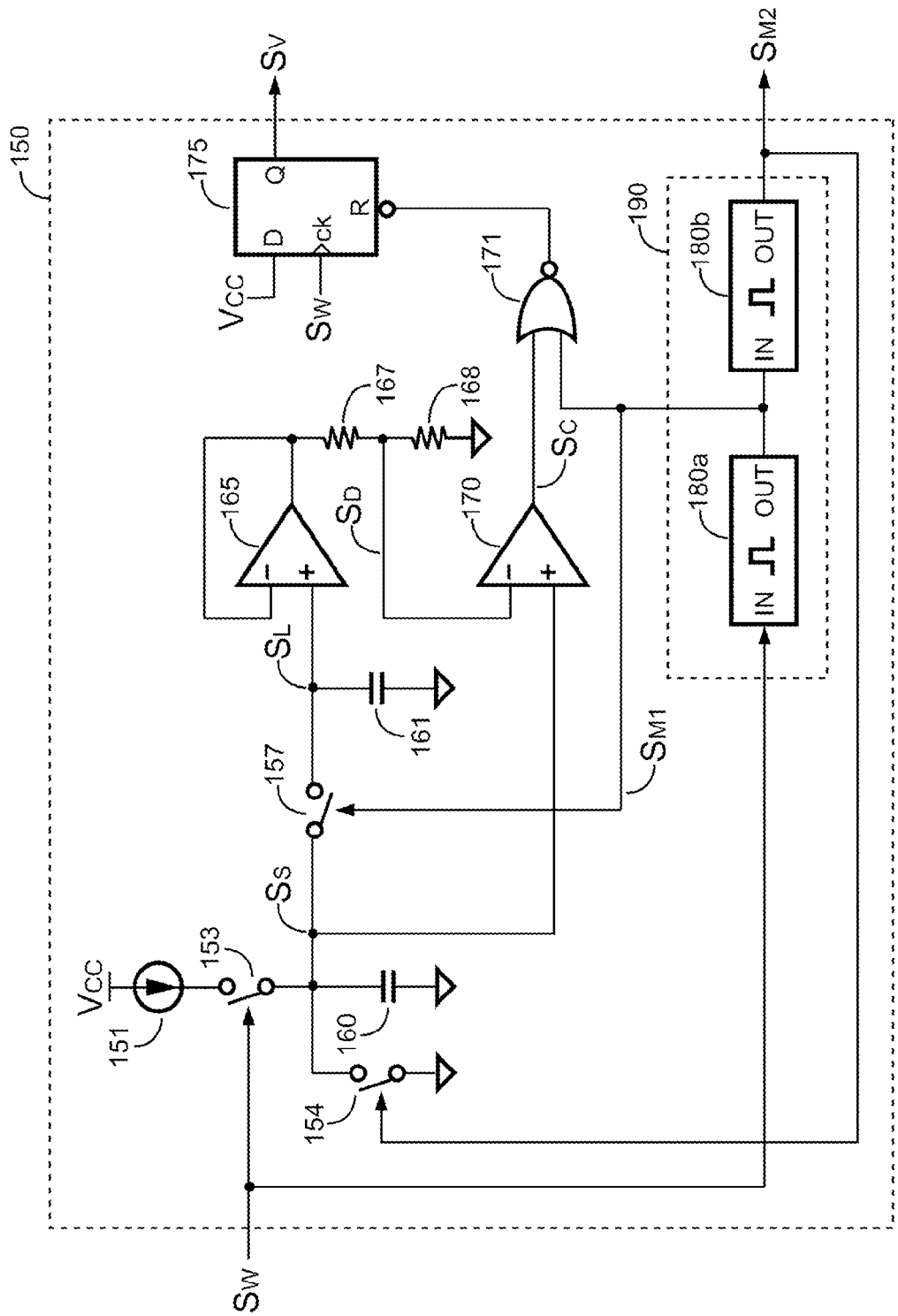
FIG. 4 shows an embodiment of a signal generator of the controller according to the present invention.

FIG. 4 shows an embodiment of the signal generator 150 of the controller 50 according to the present invention. The signal generator 150 comprises a charging circuit, a pulse generator 190, and an output circuit. The charging circuit comprises a current source 151, capacitors 160 and 161, and switches 153, 154 and 157. The output circuit comprises an operational amplifier 165, resistors 167 and 168, a comparator 170, a NOR gate 171, and a flip-flop 175. The pulse generator 190 comprises one-shot circuits 180a and 180b. An input terminal of the one-shot circuit 180a receives the switching signal $S_W$. An output terminal of the one-shot circuit 180a enables a first sampling pulse $S_{M1}$ at the falling-edge of the switching signal $S_W$ for a delay time $T_D$. An input terminal of the one-shot circuit 180b is connected to the output terminal of the one-shot circuit 180a. An output terminal of the one-shot circuit 180b enables the second sampling pulse $S_{M2}$ at the falling-edge of the first sampling pulse $S_{M1}$ for the delay time $T_D$. The current source 151 is connected between a supply voltage $V_{CC}$ and a first terminal of the switch 153. The capacitor 160 is connected between a second terminal of the switch 153 and a ground reference. The switch 154 is connected in parallel with the capacitor 160. The switch 153 is controlled by the switching signal $S_W$. As the switching signal $S_W$ is enabled, the switch 153 will be turned on and the half signal $S_V$ at an output of the flip-flop 175 will become enabled. The current source 151 will start to charge the capacitor 160 via the switch 153, and a signal $S_S$ will be therefore obtained across the capacitor 160. The signal $S_S$ is supplied to a positive terminal of the comparator 170. The capacitor 160 will be discharged once the second sampling pulse $S_{M2}$ is enabled to turn on the switch 154. The charging circuit is therefore reset by the second sampling pulse $S_{M2}$. Once the first sampling pulse $S_{M1}$ is enabled to turn on the switch 157, the signal $S_S$ will be conducted to form a level signal $S_L$ across the capacitor 161. The level signal $S_L$ is supplied to a positive terminal of the operational amplifier 165. A negative terminal and an output terminal of the operational amplifier 165 are connected together. The resistors 167 and 168 are connected in series between the output terminal of the operational amplifier 165 and the ground reference. A joint of the resistors 167 and 168 generates a signal $S_D$. The resistance of the resistor 167 is set equal to that of the resistor 168. Therefore, the voltage level of the signal $S_D$ will be half of that of the level signal $S_L$. The signal $S_D$ is supplied to a negative terminal of the comparator 170. Once the voltage level of the signal $S_S$ is higher than that of the signal $S_D$, a signal $S_C$ generated at an output of the comparator 170 will become logic-high. This will reset the flip-flop 175 via the NOR gate 171 and disable the half signal $S_V$ at the output of the flip-flop 175.

Figure 5:
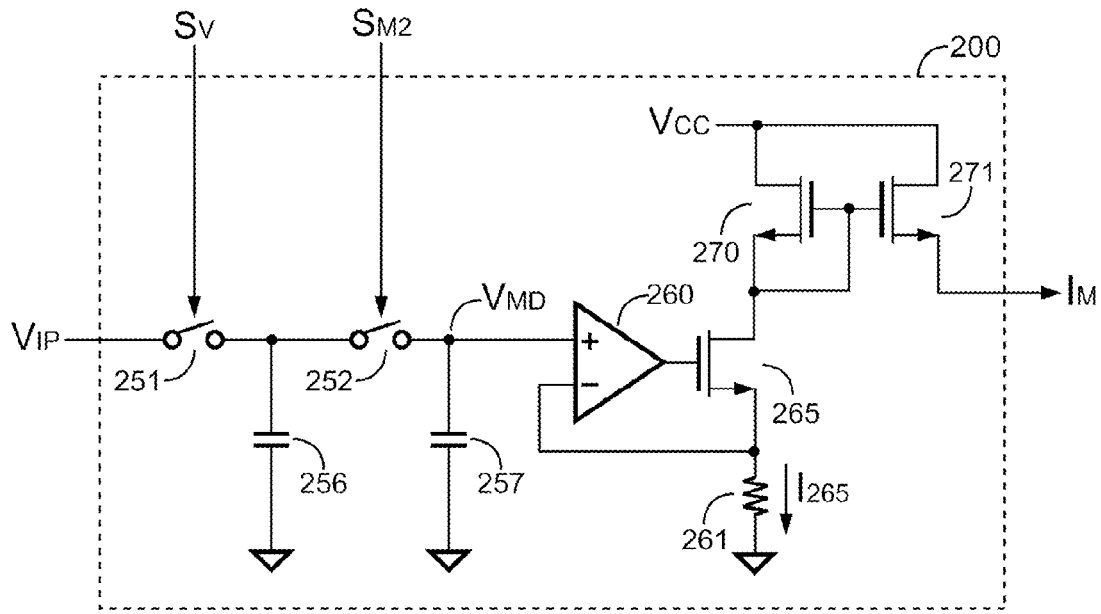
FIG. 5 shows an embodiment of a correlation circuit of the controller according to the present invention.

FIG. 5 shows an embodiment of the correlation circuit 200 of the controller 50 according to the present invention. The correlation circuit 200 comprises a sample-and-hold circuit and a voltage-to-current circuit. The sample-and-hold circuit comprises switches 251, 252 and capacitors 256 and 257. The voltage-to-current circuit comprises an operational amplifier 260, transistors 265, 270, 271 and a resistor 261. A first terminal of the switch 251 receives the switching-current signal $V_{IP}$. A second terminal of the switch 251 is connected to a first terminal of the switch 252. A second terminal of the switch 252 is connected to a positive terminal of the operational amplifier 260. The capacitor 256 is connected between the second terminal of the switch 251 and the ground reference. The capacitor 257 is connected between the second terminal of the switch 252 and the ground reference. Once the half signal $S_V$ is enabled, the switching-current signal $V_{IP}$ will charge the capacitor 256. Once the second sampling pulse $S_{M2}$ is enabled while the half signal $S_V$ is being disabled, a middle voltage $V_{MD}$ can be obtained across the capacitor 257. The voltage-to-current circuit generates the modulating current $I_M$ which is correlated to a current $I_{265}$ flowing through the transistor 265. Following equation shows the relationship between the current $I_{265}$ and the middle voltage $V_{MD}$. According to the below equation, the modulating current $I_M$ is also correlated to the middle voltage $V_{MD}$ which is equal to a level of the switching-current signal $V_{IP}$ sampled at the half of an on-period $T_{ON}$ of the switching signal $S_W$.

$$I_M \propto I_{265} = \frac{V_{MD}}{R_{261}} \quad (1)$$

Figure 6:
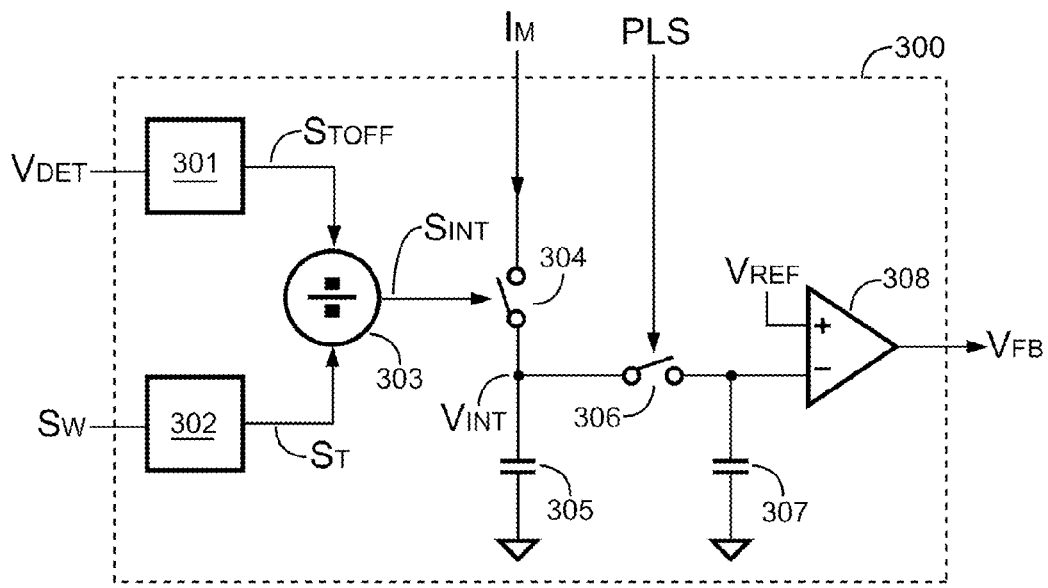
FIG. 6 shows an embodiment of a feedback modulator of the controller according to the present invention.

FIG. 6 shows an embodiment of the feedback modulator 300 of the controller 50 according to the present invention. The feedback modulator 300 comprises an off-period converter 301, a full-period converter 302, a divider 303, an integrator, and an error amplifier 308. The integrator comprises switches 304, 306 and capacitors 305, 307. The off-period converter 301 receives the detection signal $V_{DET}$ to generate an off-period signal $S_{TOFF}$. The off-period signal $S_{TOFF}$ is correlated to an off-period $T_{OFF}$ of the switching signal $S_W$. The full-period converter 302 receives the switching signal $S_W$ to generate a full-period signal $S_T$. The full-period signal $S_T$ is correlated to a full-period T of the switching signal $S_W$. The divider 303 receives the off-period signal $S_{TOFF}$ and the full-period signal $S_T$ to generate an integrating signal $S_{INT}$. An enabled duration of the integrating signal $S_{INT}$ is proportional to a value that the off-period $T_{OFF}$ of the switching signal $S_W$ is divided by a full-period T of the switching signal $S_W$. Once the switch 304 is turned on by the integrating signal $S_{INT}$, the modulating current $I_M$ will start to charge the capacitor 305. An integrated voltage $V_{INT}$ is therefore obtained across the capacitor 305. As the pulse signal PLS is enabled again, the switch 306 will conduct the integrated voltage $V_{INT}$ to the capacitor 307. The integrated voltage $V_{INT}$ is then supplied to a negative terminal of the error amplifier 308. A positive terminal of the error amplifier 308 is supplied with a reference voltage $V_{REF}$. The error amplifier 308 amplifies the error between the reference voltage $V_{REF}$ and the integrated voltage $V_{INT}$ to modulate the feedback signal $V_{FB}$ accordingly. The operations of the off-period converter 301, the full-period converter 302, and the divider 303 can be found in US patent application US20080232142 by Yang titled "Output Current Control Circuit for Power Converter with a Changeable Switching Frequency" and will be omitted herein.

Figure 7:
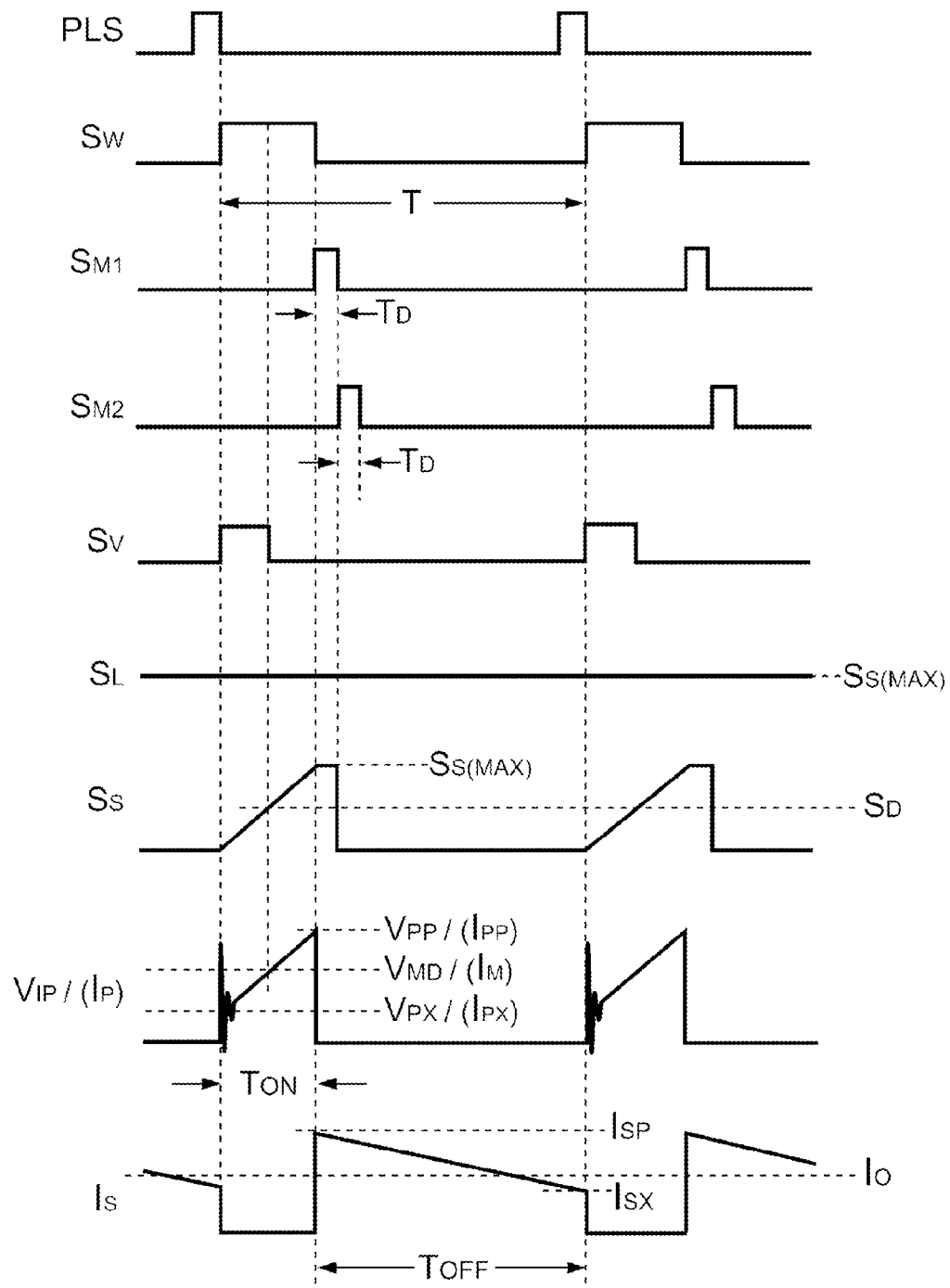
FIG. 7 shows key waveforms of the primary-side-regulation power converter according to the present invention.

Referring to FIG. 7, the switching signal $S_W$ will be enabled at the falling-edge of the pulse signal PLS. The half signal $S_V$ is also enabled in response to the switching signal $S_W$. Both referring to FIG. 4 and FIG. 5, the signal $S_S$ will start to ramp up as the switching signal $S_W$ is enabled. Before the voltage level of the signal $S_S$ exceeds that of the signal $S_D$, the half signal $S_V$ will remain enabled. This enables the switching-current signal $V_{IP}$ to charge the capacitor 256 continuously. Once the voltage level of the signal $S_S$ exceeds that of the signal $S_D$, the half signal $S_V$ will become disabled. As a result, an on-period of the half signal $S_V$ will be half of the on-period $T_{ON}$ of the switching signal $S_W$. The switching-current signal $V_{IP}$ sampled as the half signal $S_V$ is disabled will be therefore held across the capacitor 256.

While the half signal $S_V$ is disabled, the signal $S_S$ still continuously ramps up in response to the enabled switching signal $S_W$. Once the switching signal $S_W$ is disabled, the signal $S_S$ will be held as a maximum voltage level, which is denoted as $S_{S(MAX)}$, across the capacitor 160. In the meantime, the first sampling pulse $S_{M1}$ will be enabled accordingly for the delay time $T_D$. This will turn on the switch 157 to conduct the maximum voltage level $S_{S(MAX)}$ of the signal $S_S$ to the capacitor 161 for generating the level signal $S_L$. The level signal $S_L$ is then divided by the two resistors 167 and 168 to generate the signal $S_D$ for being compared with the signal $S_S$ which represents the next cycle on-period $T_{ON}$ of the switching signal $S_W$. As the first sampling pulse $S_{M1}$ is disabled, the second sampling pulse $S_{M2}$ will be enabled accordingly for the delay time $T_D$. The switch 252 will be turned on, and the voltage held across the capacitor 256 will be conducted to the capacitor 257 to generate a middle voltage $V_{MD}$. The middle voltage $V_{MD}$ is supplied to the voltage-to-current circuit for generating the modulating current $I_M$. The modulating current $I_M$ is therefore proportional to the sum of the voltage levels $V_{PP}$ and $V_{PX}$ as shown in FIG. 7.

Figure 8:
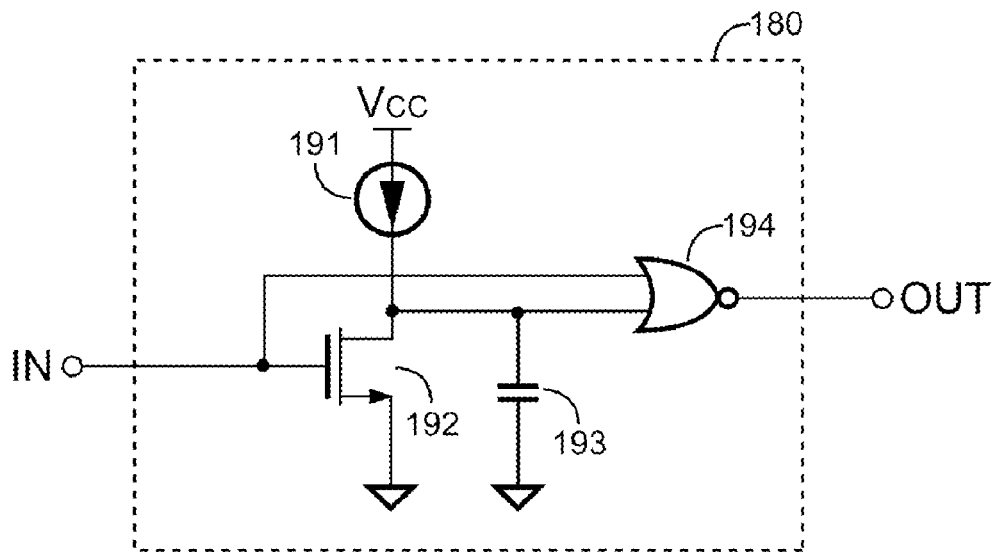
FIG. 8 shows an embodiment of a one-shot circuit of the signal generator according to the present invention.

FIG. 8 shows a schematic circuit of a one-shot circuit 180, which embodies the one-shot circuits 180a and 180b of the pulse generator 190, according to the present invention. The one-shot circuit 180 comprises a current source 191, a transistor 192, a capacitor 193, and a NOR gate 194. An input terminal IN of the one-shot circuit 180 is connected to a gate of the transistor 192 and a first input of the NOR gate 194. The current source 191 is connected between the supply voltage $V_{CC}$ and a drain of the transistor 192. A source of the transistor 192 is connected to the ground reference. The capacitor 193 is connected between the drain of the transistor 192 and the ground reference. A second input terminal of the NOR gate 194 is connected to the drain of the transistor 192. An output of the NOR gate 194 is connected to an output terminal OUT of the one-shot circuit 180. Once the signal supplied to the input terminal IN of the one-shot circuit 180 drops from logic-high to logic-low, the output terminal OUT of the one-shot circuit 180 will generate a logic-high signal for the delay time $T_D$. The delay time $T_D$ is determined by a current of the current source 191 and a capacitance of the capacitor 193.

Figure 9:
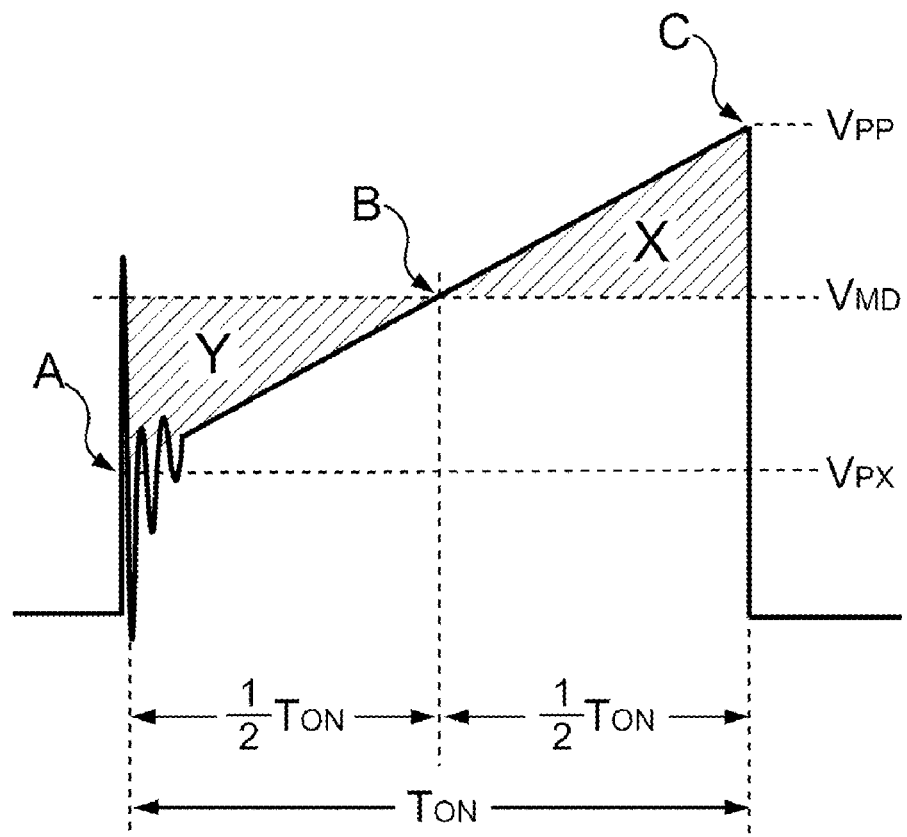
FIG. 9 shows a waveform of the switching-current signal according to the present invention.

FIG. 9 shows the waveform of the switching-current signal $V_{IP}$. Since the primary winding $N_P$ and the secondary winding $N_S$ are magnetically coupled, a peak level $I_{PP}$ and a continuous level $I_{PX}$ of the primary-side switching current $I_P$ are respectively correlated to a peak level $I_{SP}$ and a continuous level $I_{SX}$ of a secondary-side switching current $I_S$. Their correlation can be expressed by the following equation:

$$(I_{PP} + I_{PX}) = \frac{T_{NP}}{T_{NS}} \times (I_{SP} + I_{SX}) \quad (2)$$

where $T_{NP}$ is the turns of the primary winding $N_P$; and $T_{NS}$ is the turns of the primary winding $N_S$.

As shown in equation (2) and FIG. 7, the primary-side current area is proportional to the secondary-side current area. Therefore, if we can calculate the primary-side current area, the secondary-side current area can be therefore determined. This also means the output current $I_O$ can be regulated.

Referring to FIG. 9, a continuous level $V_{PX}$ of the switching-current signal $V_{IP}$ is difficultly to detect because of the interference of the voltage spike occurring at the leading edge thereof. Further referring to FIG. 9, the slope from point A to point B is equal to that from point B to point C. Once we sample the switching-current signal $V_{IP}$ at half of the on-period $T_{ON}$ of the switching signal $S_W$ to obtain the middle voltage $V_{MD}$ (at point B), the triangle area X will be equal to the triangle area Y. In continuous current mode regulation, the original trapezoid area calculation will become a simple rectangle area calculation. This eliminates the need to know the continuous level $V_{PX}$ (the shorter parallel side of the trapezoid) of the switching-current signal $V_{IP}$. As a result, the present invention will not only apply to continuous current mode (trapezoid area calculation) regulation but also discontinuous current mode (triangle area calculation) regulation. The middle voltage $V_{MD}$ can be expressed by the following equation:

$$V_{MD} = \frac{1}{2} \times (V_{PP} + V_{PX}) \propto I_O \quad (3)$$

As following equation shows, once we can regulate the middle voltage $V_{MD}$, the output current $I_O$ can be therefore regulated.

$$I_O = \frac{T_{NP}}{T_{NS}} \times \frac{1}{2}(I_{SP} + I_{SX}) \times \frac{T_{OFF}}{T} = \frac{T_{NP}}{T_{NS}} \times \left(\frac{V_{MD}}{R_{30}}\right) \times \frac{T_{OFF}}{T} \quad (4)$$

where $R_{30}$ is a resistance of the resistor 30.

As aforementioned, the present invention only samples one magnitude, which is the middle voltage $V_{MD}$, of the switching-current signal $V_{IP}$ at half of the on-period $T_{ON}$ of the switching signal $S_W$. This reduces the manufacturing cost and raises the regulating precision of the primary-side-regulation power converter. Furthermore, since the middle voltage $V_{MD}$ of the switching-current signal $V_{IP}$ is sampled at half of the on-period $T_{ON}$ of the switching signal $S_W$, the primary-side-regulation power converter can be operated at both continuous current mode and discontinuous current mode.

Figure 10:
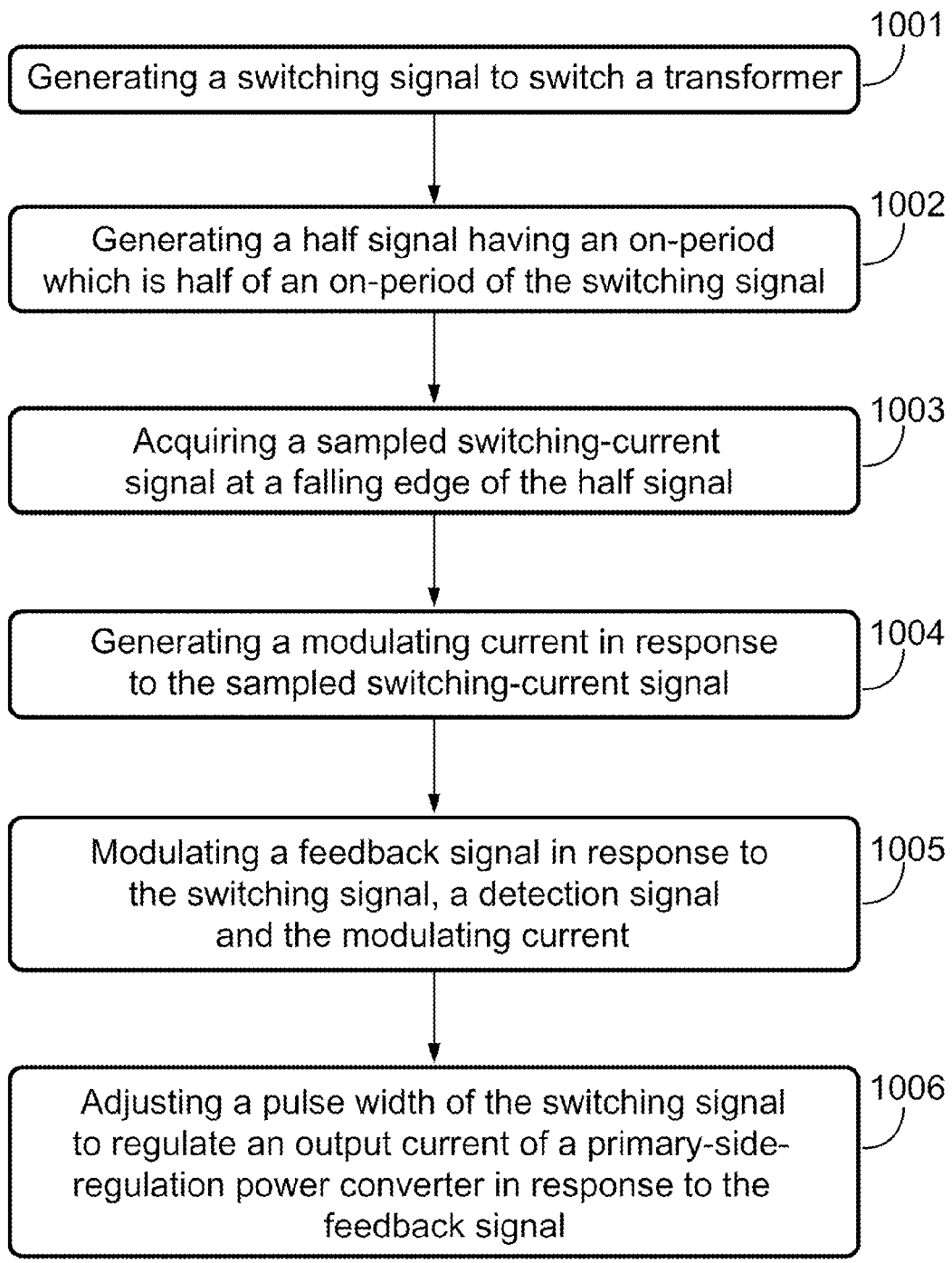
FIG. 10 shows a flowchart depicting a method of operating a primary-side-regulation power converter at both continuous current mode and discontinuous current mode.

FIG. 10 shows a flowchart depicting a method of operating a primary-side-regulation power converter at both continuous current mode and discontinuous current mode according to the present invention. Both referring to FIG. 7 and FIG. 10, firstly, the switching signal $S_W$ is generated to switch the transformer 10 (Step 1001). Next, the half signal $S_V$ having an on-period which is half of an on-period $T_{ON}$ of the switching signal $S_W$ is generated (Step 1002). Next, the sampled switching-current signal $V_{IP}$ is acquired at the falling-edge of the half signal $S_V$ (Step 1003). Next, the modulating current $I_M$ is generated in response to the sampled switching-current signal $V_{IP}$ (Step 1004). The feedback signal $V_{FB}$ is modulated in response to the switching signal $S_W$, the detection signal $V_{DET}$ and the modulating current $I_M$ (Step 1005). Last, the pulse width of the switching signal $S_W$ is adjusted for regulating the output current $I_O$ of the primary-side-regulation power converter in response to the feedback signal $V_{FB}$ (Step 1006).

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An apparatus of operating a primary-side-regulation power converter at both continuous current mode and discontinuous current mode, comprising: a switching circuit, generating a switching signal to switch a transformer; a signal generator, generating a half signal and a sampling pulse in response to said switching signal; a correlation circuit, receiving said half signal, said sampling pulse, and a switching-current signal for generating a modulating current; and a feedback modulator, modulating a feedback signal in response to said modulating current, a detection signal, and said switching signal; wherein said detection signal obtained from said transformer is correlated to an output voltage of said primary-side-regulation power converter; and wherein said feedback signal is used to adjust a pulse width of said switching signal for regulating said primary-side-regulation power converter.

2. The apparatus as claimed in claim 1, wherein an on-period of said half signal is half of an on-period of said switching signal.

3. The apparatus as claimed in claim 2, wherein said switching-current signal is sampled at a falling-edge of said half signal.

4. The apparatus as claimed in claim 1, wherein said signal generator comprises:
a charging circuit, generating a level signal, wherein a voltage level of said level signal is correlated to a pulse width of said switching signal;
a pulse generator, generating a first sampling pulse and said second sampling pulse, wherein said first sampling pulse is used to change said level signal cycle-by-cycle, and said second sampling pulse is used to reset said charging circuit; and an output circuit, generating said half signal, wherein an on-period of said half signal is half of an on-period of said switching signal.

5. The apparatus as claimed in claim 1, wherein said correlation circuit comprises:
   a sample-and-hold circuit, generating a middle voltage, wherein said middle voltage is generated in response to an on-period of said half signal; and
   a voltage-to-current circuit, generating said modulating current in response to said middle voltage.

6. The apparatus as claimed in claim 1, wherein said feedback modulator comprises:
   an off-period converter, receiving said detection signal to generate an off-period signal, wherein said off-period signal is correlated to an off-period of said switching signal;
   a full-period converter, receiving said switching signal to generate a full-period signal, wherein said full-period signal is correlated to a full-period of said switching signal;
   a divider, generating an integrating signal in response to said off-period signal and said full-period signal, wherein an enabled duration of said integrating signal is proportional to a value that said off-period of said switching signal is divided by said full-period of said switching signal;
   an integrator, receiving said modulating current and said integrating signal to generate an integrated voltage; and
   an error amplifier, modulating said feedback signal in response to an error between said integrated voltage and a reference signal.

7. A method of operating a primary-side-regulation power converter at both continuous current mode and discontinuous current mode, comprising the steps of: generating a switching signal to switch a transformer; generating a half signal having an on-period which is half of an on-period of said switching signal; acquiring a sampled switching-current signal at a falling-edge of said half signal; generating a modulating current in response to said sampled switching-current signal; modulating a feedback signal in response to said switching signal, a detection signal, and said modulating current; and adjusting a pulse width of said switching signal for regulating an output current of said primary-side-regulation power converter in response to said feedback signal, wherein said detection signal is obtained from said transformer, said detection signal is correlated to an output voltage of said primary-side-regulation power converter.

\* \* \* \* \*